(12) United States Patent
Minami

(10) Patent No.: US 6,744,726 B1
(45) Date of Patent: Jun. 1, 2004

(54) PVC MANAGEMENT SYSTEM AND METHOD

(75) Inventor: Shojiro Minami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/280,832

(22) Filed: Mar. 30, 1999

(30) Foreign Application Priority Data

Mar. 31, 1998 (JP) .......................................... 10/087655

(51) Int. Cl.[7] .............................. H04J 3/14; H04L 12/56
(52) U.S. Cl. .................................... 370/217; 370/395.1
(58) Field of Search ................................ 370/216, 217, 370/218, 221–228, 395.1, 395.31, 397, 399; 714/4

(56) References Cited

U.S. PATENT DOCUMENTS

| | | | | |
|---|---|---|---|---|
| 5,398,236 A | * | 3/1995 | Hemmady et al. | 370/218 |
| 5,781,537 A | * | 7/1998 | Ramaswami et al. | 370/254 |
| 6,038,219 A | * | 3/2000 | Mawhinney et al. | 370/242 |
| 6,055,239 A | * | 4/2000 | Kato | 370/409 |
| 6,115,382 A | * | 9/2000 | Abe | 370/395.3 |
| 6,229,787 B1 | * | 5/2001 | Byrne | 370/218 |

FOREIGN PATENT DOCUMENTS

| | | |
|---|---|---|
| JP | Hei 6-326704 | 11/1994 |
| JP | Hei 7-264240 | 10/1995 |
| JP | Hei 9-46346 | 2/1997 |
| JP | 9-247153 | 9/1997 |

* cited by examiner

Primary Examiner—Chau Nguyen
Assistant Examiner—Soon-Dong Hyun
(74) Attorney, Agent, or Firm—Whitman, Curtis & Christofferson, P.C.

(57) ABSTRACT

A PVC management system in each of ATM switches is disclosed. Each of the ATM switches includes a pair of an incoming header translator and an outgoing header translator, which are provided for each line. The incoming header translator and the outgoing header translator are controlled to provide a working PVC and a protection PVC which are associated with different transmission lines, wherein the working PVC and the protection PVC are selectable under control of a network management system.

15 Claims, 3 Drawing Sheets

PVC MANAGEMENT SYSTEM AND METHOD

BACKGROUND OF THE INVENTION

1. Field of the Invention

The present invention generally relates to restoration strategies in ATM transmission systems, and in particular to a permanent virtual circuit (PVC) management method and system in an ATM switch for restoring data transmission when a fault occurs on a transmission line between ATM switches.

2. Description of the Related Art

Asynchronous Transfer Mode (ATM) communications are becoming widely used to allow various kinds of data of different bit rates to be transferred at high speeds, which is expected to realize the Broadband Integrated Services Digital Network (B-ISDN). In an ATM switched network composed of a plurality of ATM switches, a permanent virtual circuit (PVC) is established to provide a point-to-point connection through a plurality of ATM switches. Since PVC is a static connection, however, when a failure occurs on a transmission line between ATM switches, ATM cell transmission becomes impossible.

To avoid such a breakdown of communications, there has been proposed an ATM switch having a restoration function in Japanese Patent Unexamined Publication No. 9-247153. This conventional ATM switch is provided with a VPI/VCI conversion table storing a set of VPI and VCI for working path and another set of VPI and VCI for protecting path for each cell. When a failure is detected on a working line, the call on the working line is switched to an alternative line without call interruption.

SUMMARY OF THE INVENTION

An object of the present invention is to provide a PVC management method and system which can achieve rapid fault recovery when a fault occurs on a transmission line between ATM switches.

Another object of the present invention is to provide a method and system which can achieve automatic fault recovery with simplified procedures.

According to an aspect of the present invention, in a system for managing a permanent virtual circuit (PVC) including a plurality of ATM switches in an ATM network including a network management system, each of the ATM switches includes a pair of an incoming header translator and an outgoing header translator, which are provided for each line; and a PVC controller controlling the incoming header translator and the outgoing header translator to provide a working PVC and a protection PVC which are associated with different transmission lines, wherein the working PVC and the protection PVC are selectable under control of the network management system.

The PVC controller may control the incoming header translator and the outgoing header translator such that the working PVC is set up and the protection PVC stands ready to be set up, wherein, when a failure occurs on a transmission line associated with the working PVC, the protection PVC is set up to ensure cell communication in place of the working PVC. When the transmission line associated with the working PVC has been restored, the working PVC is set up to ensure cell communication in place of the protection PVC.

DETAILED DESCRIPTION OF THE PREFERRED EMBODIMENT

Figure 1:
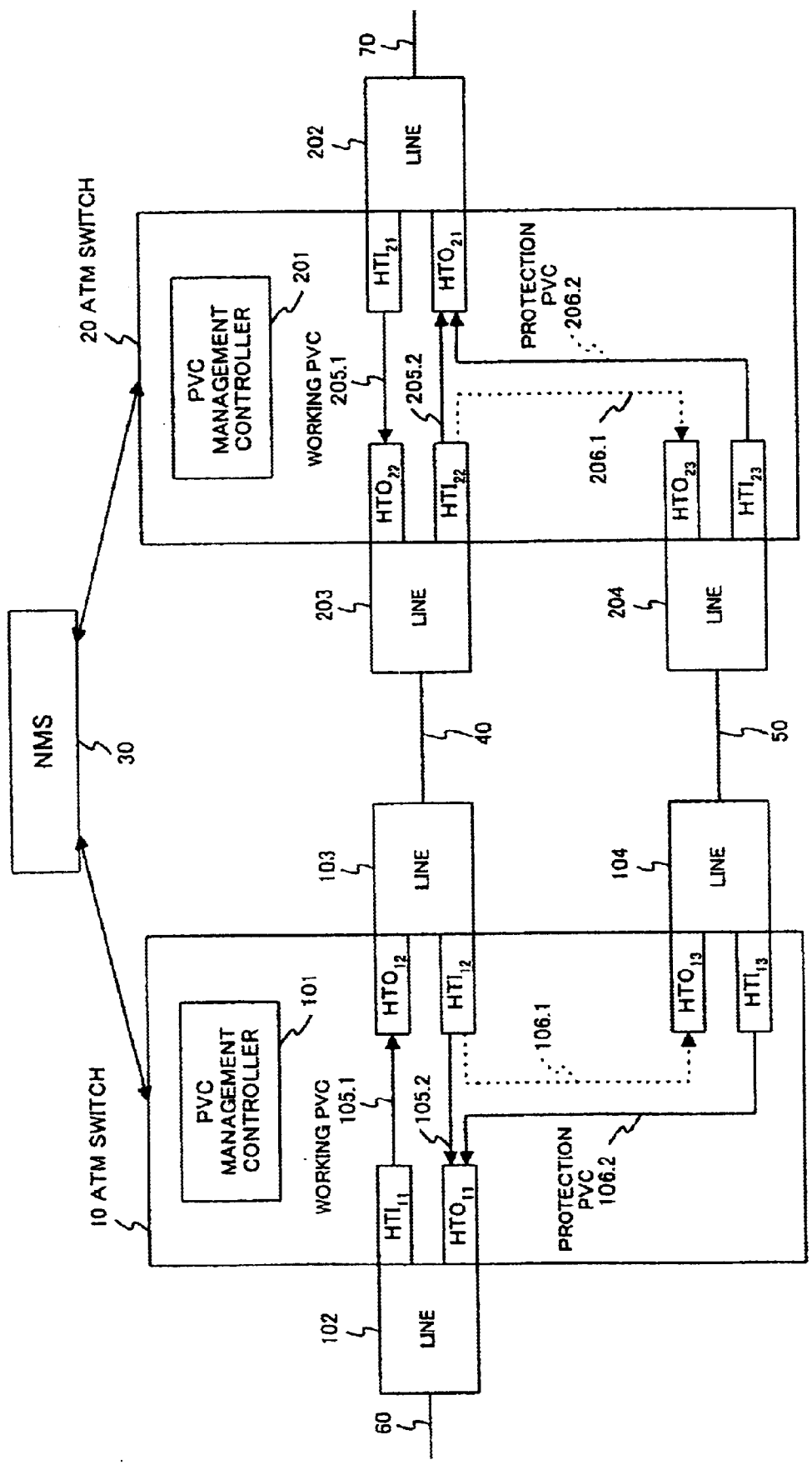
FIG. 1 is a block diagram showing the functional configuration of an ATM switch according to an embodiment of the present invention.

As shown in FIG. 1, a system according to the present invention and the operation thereof will be described hereinafter, taking as an example the case of two ATM switches 10 and 20 which are managed by a network management system (NMS) 30. And it is further assumed that the ATM switches 10 and 20 are connected to each other through transmission lines 40 and 50 that may be composed of an optical fiber.

The ATM switch 10 includes a PVC management controller 101 which manages a pair of header translator incoming (HTI) and header translator outgoing (HTO) provided for each of the lines set therein. The HTI performs a conversion of the header of an incoming cell to an internal channel header according to PVC information set by the PVC management controlling 101. The HTO performs a conversion of the internal channel header to a header of an outgoing cell according to PVC information set by the PVC management controller 101.

In this example, $HTO_{11}$ and $HTI_{11}$ are provide with PVC information for a line 102 connected to a transmission line 60. $HTO_{12}$ and $HTI_{12}$ are provided with PVC information for a line 103 connected to the transmission line 40. $HTO_{13}$ and $HTI_{13}$ are provided with PVC information for a line 104 connected to the transmission line 50.

Similarly, the ATM switch 20 includes a PVC management controller 201 which manages a pair of HTI and HTO provided for each of the lines set therein. The HTI performs a conversion of the header of an incoming cell to an internal channel header according to PVC information set by the PVC management controller 201. The HTO performs a conversion of the internal channel header to a header of an outgoing cell according to PVC information set by the PVC management controller 201.

In this example, $HTO_{21}$ and $HTI_{21}$ are provided with PVC information for a line 202 connected to a transmission line 70. $HTO_{22}$ and $HTI_{22}$ are provided with PVC information for a line 203 connected to the transmission line 40. $HTO_{23}$ and $HTI_{23}$ are provided with PVC information for a line 204 connected to the transmission line 50.

The respective lines 103 and 203 terminate the transmission line 40 at the ends thereof and the respective lines 104 and 204 terminate the transmission line 50 at the ends thereof. The line 102 terminates the end of the transmission line 60 and the line 202 terminates the end of the transmission line 70.

The PVC management controllers 101 and 201 perform the PVC setup and the working/protection-PVC switching depending on instructions received from the network management system NMS 30. More specifically, the PVC management controller 101 performs the setup of working PVC by sending a working-PVC setup request to each of relevant HTIs and HTOs and saving the set working-PVC information. Similarly, the PVC management controller 101 performs the setup of protection PVC by sending a protection-PVC setup request to each of relevant HTIs and HTOs and saving the set protection-PVC information. Further, the PVC management controller 101 performs the switching between the working PVC and the protection PVC by sending a PVC switch request to each of relevant HTIs and HTOs. Therefore, as will be described later, the PVC management controller 101 can interconnect one line and another line to set up a bi-directional PVC according to the control of the NMS 30.

Similarly, the PVC management controller 201 performs the setup of working PVC by sending a working-PVC setup request to each of relevant HTIs and HTOs and saving the set working-PVC information. The PVC management controller 201 performs the setup of protection PVC by sending a protection-PVC setting request to each of relevant HTIS and HTOs and saving the set protection-PVC information. Further, the PVC management controller 201 performs the switching between the working PVC and the protection PVC by sending a PVC switch request to each of relevant HTIs and HTOs. Therefore, as will be described later, the PVC management controller 201 can interconnect one line and another line to set up a bi-directional PVC according to the control of the NMS 30.

WORKING PVC SETUP

A working-PVC setup request is supplied from the NMS 30 to both the PVC management controllers 101 and 201. When receiving the working-PVC setup request, the PVC management controller 101 perform the working-PVC setup operation to form a bi-directional working PVC consisting of working PVC 105.1 from $HTI_{11}$ to $HTO_{12}$ and working PVC 105.2 from $HTI_{12}$ to $HTO_{11}$. Similarly, the PVC management controller 201 perform the working-PVC setup to form a bi-directional working PVC consisting of working PVC 205.1 from $HTI_{21}$ to $HTO_{22}$ and working PVC 205.2 from $HTI_{22}$ to $HTO_{21}$. The details will be described hereinafter referring to FIGS. 1 and 2.

Figure 2:
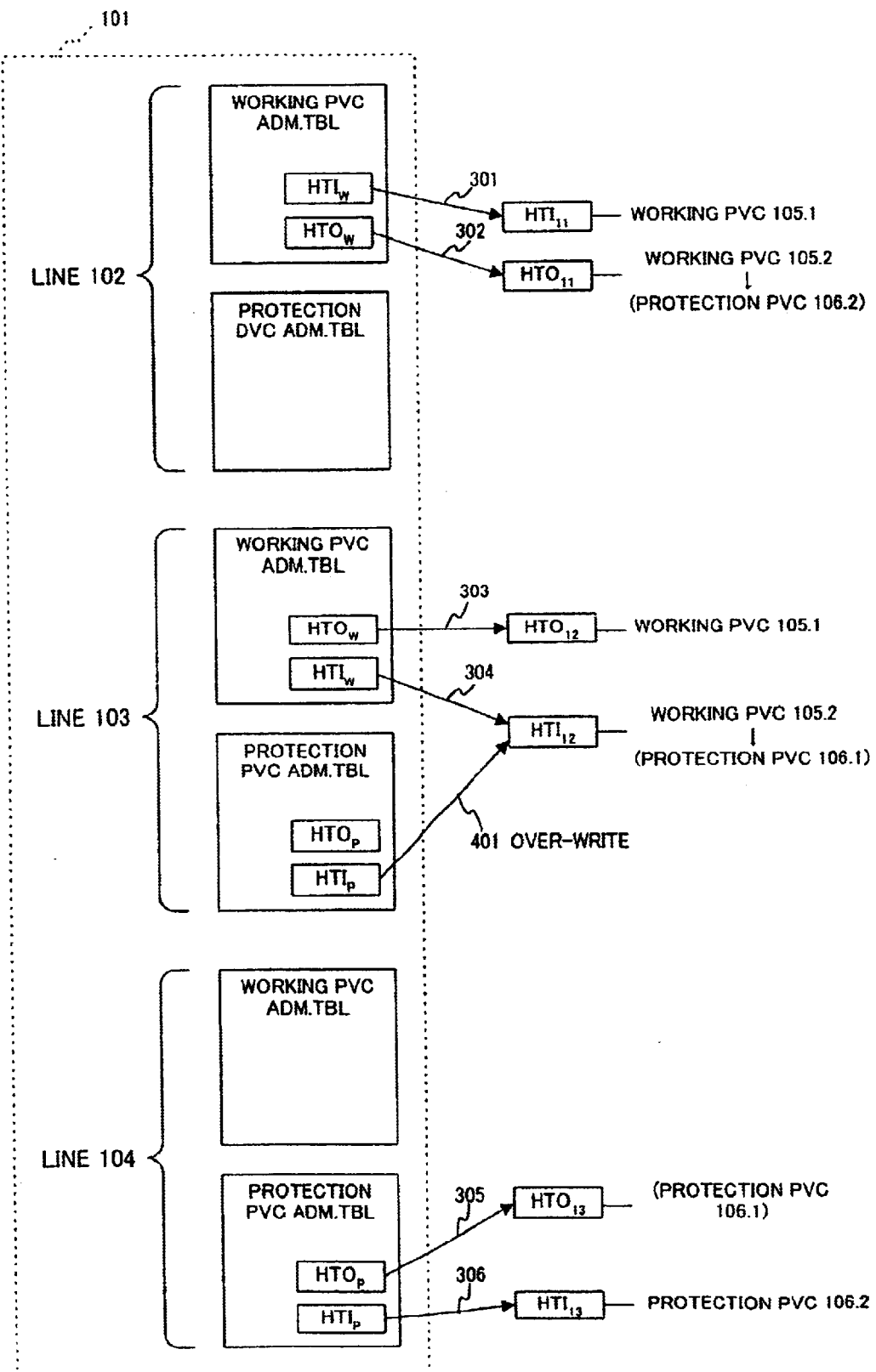
FIG. 2 is a schematic diagram showing an example of the setting operation of a PVC management controller according to the embodiment of the present invention.

Referring to FIG. 2, to set up the working PVC 105.1 and 105.2, the PVC management controller 101 requests the working-PVC setup of the $HTI_{11}$, $HTO_{11}$, $HTO_{12}$, and $HTI_{12}$ as shown by reference numerals 301, 302, 303, and 304, respectively. At this time, the PVC management controller 101 saves working-PVC information $HTI_W$ and $HTO_W$ for the $HTI_{11}$ and $HTO_{11}$ in a working-PVC administration table for the line 102 and further saves working-PVC information $HTO_W$ and $HTI_W$ for the $HTI_{12}$ and $HTO_{12}$ in a working-PVC administration table for the line 103.

Similarly, to set up the working PVC 205.1 and 205.2, the PVC management controller 201 requests the working-PVC setup of the $HTI_{21}$, $HTO_{21}$, $HTO_{22}$, and $HTI_{22}$. At this time, the PVC management controller 201 saves working-PVC information $HTI_{11}$ and $HTO_{11}$ for the $HTI_{21}$ and $HTO_{21}$ in a working-PVC administration table for the line 202 and further saves working-PVC information $HTO_W$ and $HTI_W$ for the $HTI_{22}$ and $HTO_{22}$ in a working-PVC administration table for the line 203.

In this manner, a shown in FIG. 1, the bi-directional working PVC 105.1 and 105.2 is set up between the lines 102 and 103 in the ATM switch 10. The bi-directional working PVC 205.1 and 205.2 is set up between the lines 202 and 203 in the ATM switch 20. As a result, incoming calls from the line 102 flows out the line 202 through $HTI_{11}$, the working PVC 105.1, $HTO_{12}$, the line 103, the transmission line 40, the line 203, $HTI_{22}$, the working PVC 205.2, and $HTO_{21}$. Incoming cells from the line 202 flows out the line 102 through $HTI_{21}$, the working PVC 205.1, $HTO_{22}$, the line 203, the transmission line 40, the line 103, $HTI_{12}$, the working PVC 105.2, and $HTO_{21}$. Therefore, ATM services are realized using the working bi-directional PVC.

PROTECTION PVC PROVISION

An operator instructs the NMS 30 to provision an alternative route of the working PVC 105.1 and 105.2 and the working PVC 205.1 and 205.2. According to the protection PVC provision instruction, the NMS 30 selects the transmission line 50 to be used for an alternative route. Then the NMS 30 transmits a protection-PVC provision request for protection PVC 106.1 and 106.2 to the PVC management controller 101 of the ATM switch 10 and also transmits a protection-PVC provision request for protection PVC 206.1 and 206.2 to the PVC management controller 201 of the ATM switch 20.

When receiving the protection-PVC provision request for protection PVC 106.1 and 106.2, the PVC management controller 101 perform the protection-PVC provision operation to make the provision of the one-directional protection PVC 106.1 from $HTI_{12}$ to $HTO_{13}$ and the one-directional protection PVC 106.2 from $HTI_{13}$ to $HTO_{11}$.

More specifically, as shown in FIG. 2, to set up the one-directional protection PVC 106.1, the PVC management controller 101 requests the protection-PVC setup of the $HTO_{13}$ as shown by reference numeral 305. At this time, the PVC management controller 101 saves the protection-PVC information $HTO_P$ for the $HTO_{13}$ in a protection-PVC administration table for the line 104. However, the PVC management controller 101 does not request the protection-PVC setup of the $HTI_{12}$ at this time. Since the working-PVC information has been set on the $HTI_{12}$, if the protection-PVC setup of the $HTI_{12}$ is performed, then the setting of the $HTI_{12}$ would be updated, resulting in invalid working PVC 105.2. Therefore, the protection PVC 106.1 is unavailable at this provision stage.

On the other hand, to set up the one-directional protection PVC 106.2, the PVC management controller 101 request the protection-PVC setup of the $HTI_{13}$ as shown by reference numeral 306. At this time, the PVC management controller 101 saves the protection-PVC information $HTI_P$ for the $HTI_{13}$ in the protection-PVC administration table for the line 104. Since the working-PVC information has been set on the $HTO_{11}$, it can be also used in the protection PVC 106.2. Therefore, the PVC management controller 101 does not request the protection-PVC setup of the $HTO_{11}$.

Similarly, in the ATM switch 20, to set up the one-directional protection PVC 206.1, the PVC management controller 201 requests the protection-PVC setup of the $HTO_{23}$. At this time, The PVC management controller 201 saves the protection-PVC information $HTO_P$ for the $HTO_{23}$ in a protection-PVC administration table for the line 204. However, the PVC management controller 201 does not request the protection-PVC setup of the $HTI_{22}$ at this time. Since the working-PVC information has been set on the $HTI_{22}$, if the protection-PVC setup of the $HTI_{22}$ is performed, then the setting of the $HTI_{22}$ would be updated, resulting in invalid working PVC 205.2. Therefore, the protection PVC 206.1 is unavailable PVC 206.1 is unavailable at this provision stage.

On the other hand, to set up the one-directional protection PVC 206.2, the PVC management controller 201 request the protection-PVC setup of the $HTI_{23}$. At this time, the PVC management controller 201 saves the protection-PVC information $HTI_P$ for the $HTI_{23}$ in the protection-PVC administration table for the line 204. Since the working-PVC information has been set on the $HTO_{21}$, it can be also used in the protection PVC 206.2. Therefore, the PVC management controller 201 does not request the protection-PVC setup of the $HTO_{21}$.

In this manner, as shown in FIG. 1, the one-directional protection PVC 106.1 stands ready to be set up from the line 103 to the line 104 and the one-directional protection PVC 106.2 is set up from the line 104 to the line 102 in the ATM switch 10. Similarly, in the ATM switch 20, the one-directional protection PVC 206.1 stands ready to be set up from the line 203 to the line 204 and the one-directional protection PVC 206.2 is set up from the line 204 to the line 202.

SWITCHING FROM WORKING TO PROTECTION PVC

Figure 3:
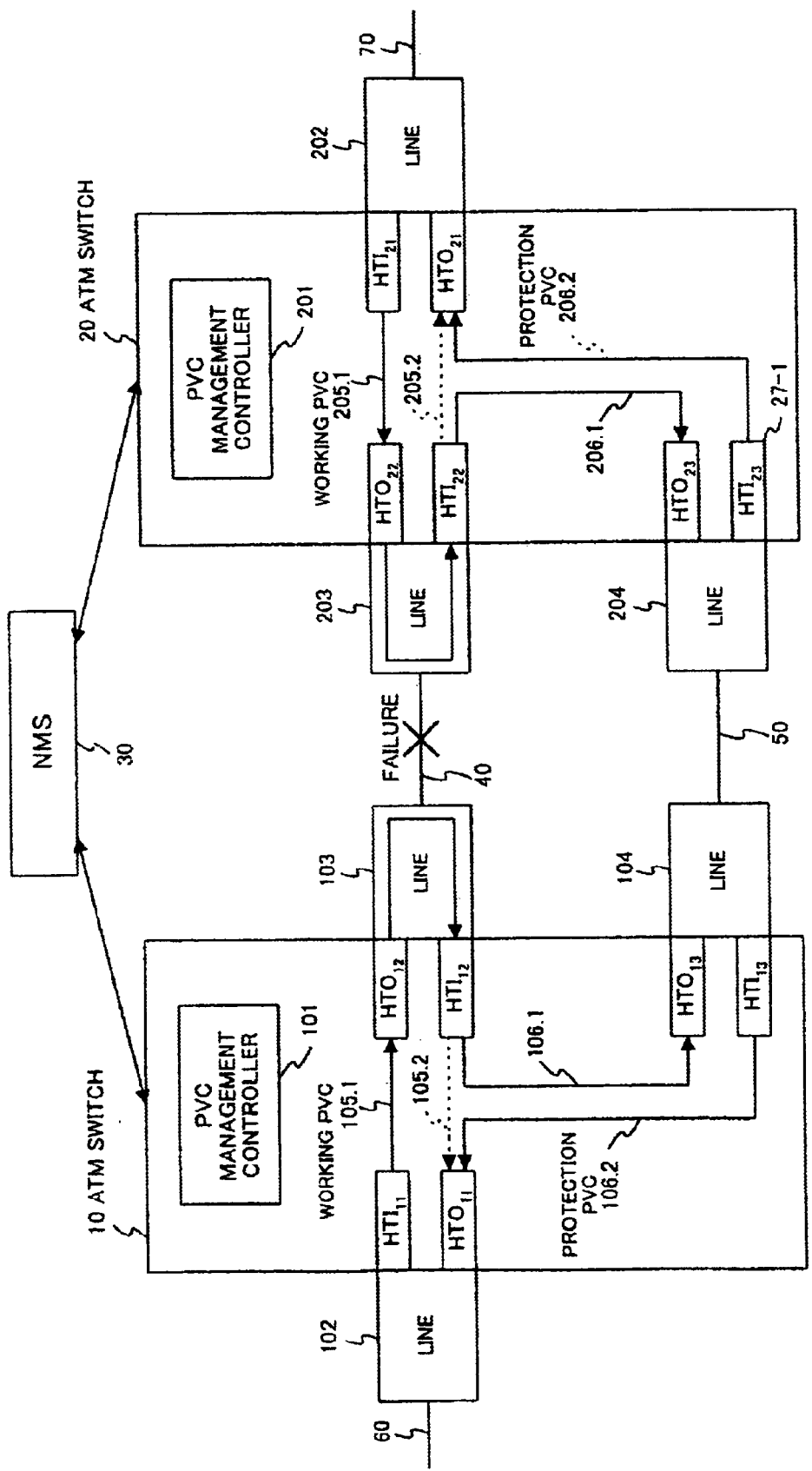
FIG. 3 is a block diagram showing a route switching operation of the embodiment when a failure occurs on a transmission line.

As shown in FIG. 3, it is assumed that a failure occurs on the transmission line 40 and is detected by both the ATM switches 10 and 20. When detecting the failure, the ATM switches 10 and 20 each transmit line failure alarm signals to the NMS 30.

When receiving the line failure alarm signals from both the ATM switches 10 and 20, the NMS 30 transmits PVS switching request signals to both the ATM switches 10 and 20. Alternatively, the operator may instruct the NMS 30 to transmit the PVC switching request signals to both the ATM switches 10 and 20.

When receiving the PVC switching request signal from the NMS 30, the PVC management controller 101 sends a loopback request to the line 103 to make the outgoing cells from the $HTO_{12}$ go back to the $HTI_{12}$ without transmitting them to the transmission line 40. At the same time, the PVC management controller 101 requests the protection-PVC setup of the $HTI_{12}$ using the protection-PVC information $HTI_P$ for the $HTI_{12}$ which has been saved in the protection-PVC administration table for the line 103. The protection-PVC information $HTI_P$ is overwritten onto the $HTI_{12}$ as shown by reference numeral 401 in FIG. 2, which causes the protection PVC 106.1 to be set up from the $HTI_{12}$ to the $HTO_{13}$.

Similarly, in the ATM switch 20, when receiving the PVC switching request signal from the NMS 30, the PVC management controller 201 sends a loopback request to the line 203 to make the outgoing cells from the $HTO_{22}$ go back to the $HTI_{22}$ without transmitting them to the transmission line 40. At the same time, the PVC management controller 201 requests the protection-PVC setup of the $HTI_{22}$ using the protection-PVC information $HTI_P$ for the $HTI_{22}$ which has been saved in the protection-PVC administration table for the line 203. The protection-PVC information $HTI_P$ is over-written onto the $HTI_{22}$, which causes the protection PVC 206.1 to be set up from the $HTI_{22}$ to the $HTO_{23}$.

In this state, as shown in FIG. 3, incoming cells from the line 102 flows out the line 202 through the protection route formed by the $HTI_{11}$, the working PVC 105.1, the $HTO_{12}$, the loopback line 103, the $HTI_{12}$, the protection PVC 106.1, the $HTO_{13}$, the line 104, the transmission line 50, the line 204, the $HTI_{23}$, the protection PVC 206.2, and the $HTO_{21}$.

Conversely, incoming cells from the line 202 flows out the line 102 through the protection route formed by the $HTI_{21}$, the working PVC 205.1, the $HTO_{22}$, the loopback line 203, the $HTI_{22}$, the protection PVC 206.1, the $HTO_{23}$, the line 204, the transmission line 50, the line 104, the $HTI_{13}$, the protection PVC 106.2, and the $HTO_{11}$.

SWITCHING BACK TO WORKING PVC

In the case where normal operations are restored on the transmission line 40, the ATM switches 10 and 20 each transmit line restoration alarm signals to the NMS 30. When receiving the line restoration alarm signals from both the ATM switches 10 and 20, the NMS 30 transmits PVC switching request signals to both the ATM switches 10 and 20. Alternatively, the operator may instruct the NMS 30 to transmit the PVC switching request signals to both the ATM switches 10 and 20.

When receiving the PVC switching request signal from the NMS 30, the PVC management controller 101 sends a loopback-release request to the line 103 to make the outgoing cells from the $HTO_{12}$ go to the transmission line 40. At the same time, the PVC management controller 101 requests the working-PVC setup of the $HTI_{12}$ using the working-PVC information $HTI_P$ for the $HTI_{12}$ which as been saved in the working-PVC administration table for the line 103. The working-PVC information $HTI_W$ is over-written onto the $HTI_{22}$ as shown by the reference numeral 304 in FIG. 2, which causes the working PVC 105.2 from the $HTI_{12}$ to the $HTO_{11}$ to be restored.

Similarly, in the ATM switch 20, when receiving the PVC switching request signal from the NMS 30, the PVC management controller 201 sends a loopback-release request to the line 203 to make the outgoing cells from the $HTO_{22}$ go to the transmission line 40. At the same time, the PVC management controller 201 requests the working-PVC setup of the $HTI_{22}$ using the working-PVC information $HTI_W$ for the $HTI_{22}$ which has been saved in the working-PVC administration table for the line 203. The working-PVC information $HTI_W$ is over-written onto the $HTI_{22}$, which causes the working PVC 205.2 from the $HTI_{22}$ to the $HTO_{21}$ to be restored.

In this manner, as shown in FIG. 1, the bi-directional working PVC 105.1 and 105.2 and the bi-directional working PVC 205.1 and 205.2 are restored. Therefore, incoming cells from the line 102 flows out the line 202 through $HTI_{11}$, the working PVC 105.1, $HTO_{12}$, the line 103, the transmission line 40, the line 203, $HTI_{22}$, the working PVC 205.2, and $HTO_{21}$. Incoming cells from the line 202 flows out the line 102 through $HTI_{21}$, the working PVC 205.1, $HTO_{22}$, the line 203, the transmission line 40, the line 103, $HTI_{12}$, the working PVC 105.2, and $HTO_{21}$.

What is claimed is:

1. A system for managing a permanent virtual circuit (PVC) including a plurality of ATM switches in an ATM network including a network management system, the ATM switches comprising:

a pair of header translators comprising an incoming header translator and an outgoing header translator, which are provided for each line; and a PVC controller controlling the incoming header translator and the outgoing header translator to provide a working PVC and a one-directional protection PVC in a first direction which are associated with different transmission lines, wherein the working PVC and the protection PVC are selectable under control of the network management system by set-up of a one directional protection PVC in a second direction.

2. The system according to claim 1, wherein the PVC controller controls the incoming header translator and the outgoing header translator such that the working PVC is set up and the protection PVC stands ready to be set up, wherein, when a failure occurs on a transmission line associated with the working PVC, the protection PVC is set up to ensure cell communication in place of the working PVC.

3. The system according to claim 2, wherein the PVC controller controls the incoming header translator and the outgoing header transistor such that, when the transmission line associated with the working PVC has been restored, the working PVC is set up to ensure cell communication in place of the p-protection PVC.

4. The system according to claim 1, wherein the PVC controller comprises:
   a working PVC table for storing working-PVC information which is used to set up the working PVC; and
   a protection PVC table for storing information used to set up the protection PVC,
   wherein the working PVC and the preparation PVC are selectively set up by selecting one of the working-PVC information and the protection-PVC information.

5. The system according to claim 1, wherein each of the ATM switches further comprises a monitor for monitoring a failure on each line, wherein when a failure is detected on a transmission line associated with the working PVC, first and second ATM switches connected by the transmission line notify the network management system of a failure occurrence, which causes the network management system to instruct the first and second ATM switches to switch from the working PVC to the protection PVC.

6. The system according to claim 5, wherein when the transmission line associated with the working PVC has been restored, the first and second ATM switches connected by the transmission line notify the network management system of failure restoration, which causes the network management system to instruct the first and second ATM switches to switch from the protection PVC to the working PVC.

7. A system for managing a permanent virtual circuit (PVC) including a first ATM switch and a second ATM switch connected through a plurality of transmission lines,
   the first ATM switch comprising:
      a pair of header translators comprising a first incoming header translator and a first outgoing header translator for a first line;
      a pair of header translators comprising a second incoming header translator and a second outgoing header translator for a second line associated with a first transmission line connected to the second ATM switch;
      a pair of header translators comprising a third incoming header translator and a third outgoing header translator for a third line associated with a second transmission line connected to the second ATM switch; and
      a first PVC controller controlling the first to third incoming header translators and the first to third outgoing header translator to provide a first working PVC associated with the first transmission line and a first one-directional protection PVC associated with the second transmission line in a first direction, wherein the first working PVC and the first protection PVC are selectable under control of the network management system by set-up of a one-directional protection PVC in a second direction on the second transmission line, and
   the second ATM switch comprising:
      a pair of header translators comprising a fourth incoming header translator and a fourth outgoing header translator for a fourth line;
      a pair if header translators comprising a fifth incoming header translator and a fifth outgoing header translator for a fifth line associated with a first transmission line connected to the first ATM switch;
      a pair of header translators comprising a sixth incoming header translator and a sixth outgoing header translator for a sixth line associated with a second transmission line connected to the first ATM switch; and
      a second PVC controller controlling the fourth to sixth incoming header translators and the fourth to sixth outgoing header translators to provide a second working PVC associated with the first transmission line and a second one-directional protection PVC associated with the second transmission line in a first direction, wherein the second working PVC and the second protection PVC are selectable under control of the network management system by set-up of a one-directional protection PVC in a second direction on the second transmission line.

8. The system according to claim 7, wherein
   the first PVC controller controls the third incoming header translator and the third outgoing header translator such that the first protection PVC stands ready to be set up, wherein where a failure occurs on the first transmission line associated with the working PVC, the first PVC controller controls the second line such that cells from the second outgoing header translator go back to the second incoming header translator to make a loopback and the first protection PVC is set up to ensure cell communication in place of the first working PVC, and
   the second PVC controller controls the sixth incoming header translator and the sixth outgoing header translator such that a first protection PVC stands ready to be set up, wherein, when a failure occurs on the first transmission line associated with the second working PVC, the second PVC controller controls the fifth line such that cells from the fifth outgoing header translator go back to the fifth incoming header translator to make a loopback and the second protection PVC is set up to ensure cell communications in place of the second working PVC.

9. A method for managing a permanent virtual circuit (PVC) including a plurality of ATM switches in an ATM network including a network management system, comprising steps of:
   at the ATM switches each including a pair of an incoming header translator and an outgoing header translator, which are provided for each line,
   storing working-PVC information onto a working-PVC table which is used by the incoming header translator and the outgoing header translator to set up the working PVC,
   storing protection PVC information onto a protection-PVC table which is used by the incoming header translator and the outgoing header translator to set up a protection PVC in a first detection associated with a transmission line different from the working PVC; and
   selectively setting up the working PVC and the protection PVC in a second direction by selecting one of the working-PVC information and the protection PVC information under control of the network management system.

10. The method according to claim 9, wherein the working PVC is set up and the protection PVC stands ready to be set up, wherein, when a failure occurs on a transmission line associated with the working PVC, the protection PVC is set up to ensure cell communication in place of the working PVC.

11. The method according to claim 10, wherein when the transmission line associated with the working PVC is restored, the working PVC is set up to ensure cell communication in place of the protection PVC.

12. An ATM switch in an ATM network including a network management system, wherein a permanent virtual connection (PVC) is set up in the ATM network, the ATM switch comprising:

a pair of an incoming header translator and an outgoing header translator which are provided for each line; and a PVC controller controlling the incoming header translator and the outgoing header translator to provide a working PVC and a one-directional protection PVC in a first direction which are associated with different transmission lines, wherein the working PVC and the protection PVC are selectable under control of the network management system by set-up of a one-directional protection PVC in a second direction.

13. The ATM switch according to claim 12, wherein the PVC controller controls the incoming header translator and the outgoing header translator such that the working PVC is set up and the protection PVC stands ready to be set up, wherein, when a failure occurs on the transmission line associated with the working PVC, the protection PVC is set up to ensure cell communication in place of the working PVC.

14. The ATM switch according to claim 13, wherein the PVC controller controls the incoming header translator such that, when the transmission line associated with the working PVC has been restored, the working PVC is set up to ensure cell communication in place of the protection PVC.

15. The ATM switch according to claim 12, wherein the PVC controller comprises:

a working-PVC table for storing working-PVC information which is used to set up the working PVC; and a protection-PVC table for the storing protection-PVC information which is used to set up the protection PVC, wherein the working PVC and the protection PVC are selectively set up by selecting one of the working-PVC information and the protection-PVC information.

* * * * *